(12) United States Patent
Santos et al.

(10) Patent No.: US 8,918,660 B2
(45) Date of Patent: Dec. 23, 2014

(54) POWER SOURCING NETWORK PORT RESET

(75) Inventors: David L. Santos, Granite Bay, CA (US); David Tremblay, Jr., Rocklin, CA (US); Giuseppe Scaglione, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 304 days.

(21) Appl. No.: 13/406,593

(22) Filed: Feb. 28, 2012

(65) Prior Publication Data

US 2013/0227306 A1 Aug. 29, 2013

(51) Int. Cl.
*G06F 1/00* (2006.01)
*G06F 1/26* (2006.01)
*G06F 1/32* (2006.01)

(52) U.S. Cl.
USPC ..................... 713/300; 713/310; 713/320

(58) Field of Classification Search
USPC .......................... 713/300, 310, 320
See application file for complete search history.

(56) References Cited

U.S. PATENT DOCUMENTS

| | | | |
|---|---|---|---|
| 7,155,622 B2* | 12/2006 | Mancey et al. | 713/324 |
| 2004/0230846 A1* | 11/2004 | Mancey et al. | 713/300 |
| 2006/0168648 A1* | 7/2006 | Vank et al. | 726/4 |
| 2008/0244282 A1* | 10/2008 | Hansalia et al. | 713/300 |
| 2008/0256598 A1 | 10/2008 | Diab | |
| 2009/0157916 A1* | 6/2009 | Chilukoor et al. | 710/38 |
| 2009/0210725 A1* | 8/2009 | Kim et al. | 713/300 |
| 2009/0249112 A1* | 10/2009 | Diab | 714/2 |
| 2010/0199113 A1* | 8/2010 | Lee | 713/300 |
| 2011/0055598 A1* | 3/2011 | Yu | 713/300 |
| 2011/0254619 A1* | 10/2011 | Velez et al. | 327/564 |
| 2012/0060042 A1* | 3/2012 | Buhari et al. | 713/320 |
| 2013/0103958 A1* | 4/2013 | Hua et al. | 713/310 |

* cited by examiner

*Primary Examiner* — Zahid Choudhury

(57) ABSTRACT

Example embodiments disclosed herein relate to selectively removing or resetting a restriction from a restricted power sourcing network port. A presence of a computing device coupled to one of a plurality of power sourcing network ports off a network device is determined. A power allocation to the power sourcing network port is determined. The computing device is authenticated to determine whether the computing device has permission to receive power from the network device. The power allocation is restricted. The restriction is selectively reset or removed.

15 Claims, 3 Drawing Sheets

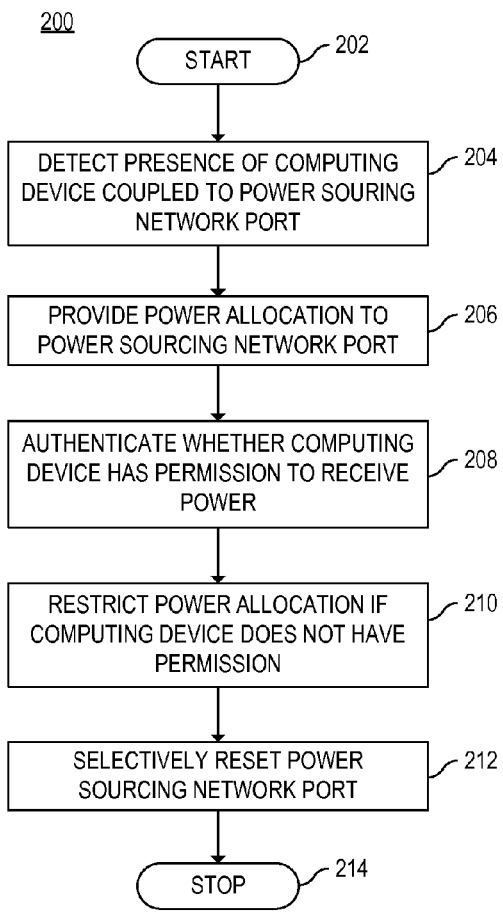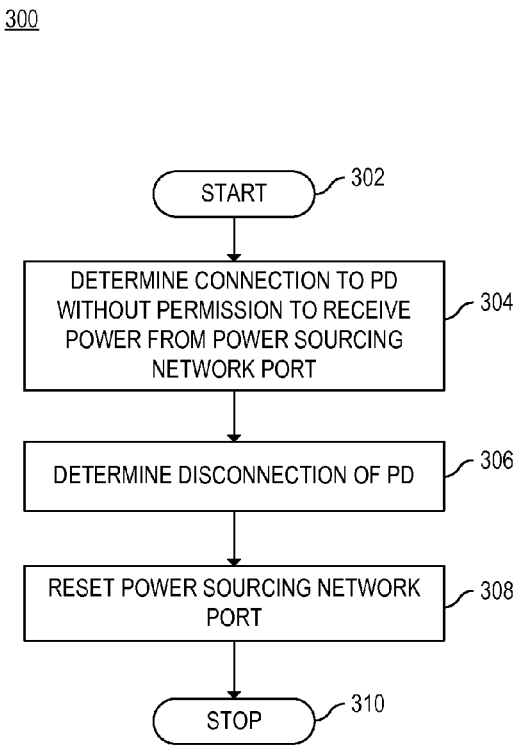
*FIG. 2*   *FIG. 3*

POWER SOURCING NETWORK PORT RESET

BACKGROUND

Computing systems today are connected via various networks, for example wired networks such as Ethernet. As these networks have developed, devices have been developed that are capable of being powered via these network connections. The Institute of Electrical and Electronics Engineers (IEEE) has developed the IEEE 802.3af and 802.3 at standards that define Power over Ethernet. Power over Ethernet systems involve delivering power from a Power Sourcing Equipment (PSE) to a Powered Device (PD) located at opposite ends of a network connection.

BRIEF DESCRIPTION OF THE DRAWINGS

The following detailed description references the drawings, wherein:

FIG. 2 is a flowchart of a method for selectively resetting a power sourcing network port, according to one example; and FIG. 3 is a flowchart of a method for resetting a power sourcing network port based on a disconnection of a previously connected computing device, according to one example.

DETAILED DESCRIPTION

As detailed above, power can be provided from power sourcing equipment (PSE) to powered devices (PDs) via network connections. Increasingly, more and more types of devices are being developed to run as PDs powered by network connections. Standards, for example, the Institute of Electrical and Electronics Engineers (IEEE) 802.3af and IEEE 802.3 at standards provide specifications to implement Power over Ethernet (PoE). Powered devices, such as Internet Protocol (IP) cameras, IP card readers, IP phones, wireless access points, phone chargers, computing devices, etc., are being added to networks and consuming power.

The proliferation of PSE devices in both public and private locations that are capable of delivering power increases the likelihood that unauthorized devices may be added to a network. As such, PDs that are unwanted by an owner or administrator of a PSE may be used. For example, an unauthorized user may attempt to use a port connected to the PSE to charge the user's phone or to add an unauthorized access point.

To alleviate some of these challenges, network authentication and/or authorization protocols can be used to control PSE to PD power delivery and/or to prevent unauthorized devices from receiving power. As such, an approach to dealing with unauthorized PDs is to perform the network authentication and to restrict (e.g., limit, remove, etc.) power from the port of the PSE providing power to the unauthorized PD. However, each time this occurs, the capacity of open usable power sourcing ports on the PSE can be diminished because of the restriction.

Accordingly, various embodiments disclosed herein relate to recovering ports that have been deemed unauthorized and/or restricted. Resetting or recovering these ports allows the PSE to reuse the port for a PD after the port has been restricted. Example approaches detailed herein allow the PSE to selectively recover one or more ports, for example, selectively recovering a port based on context. In certain embodiments, a PSE is a network device that can be configured to provide power to another device via a network connection (e.g., via an Ethernet cable). Further, in certain embodiments, a PD is a device that is configured to be powered, at least in part, by a PSE.

Figure 1A:
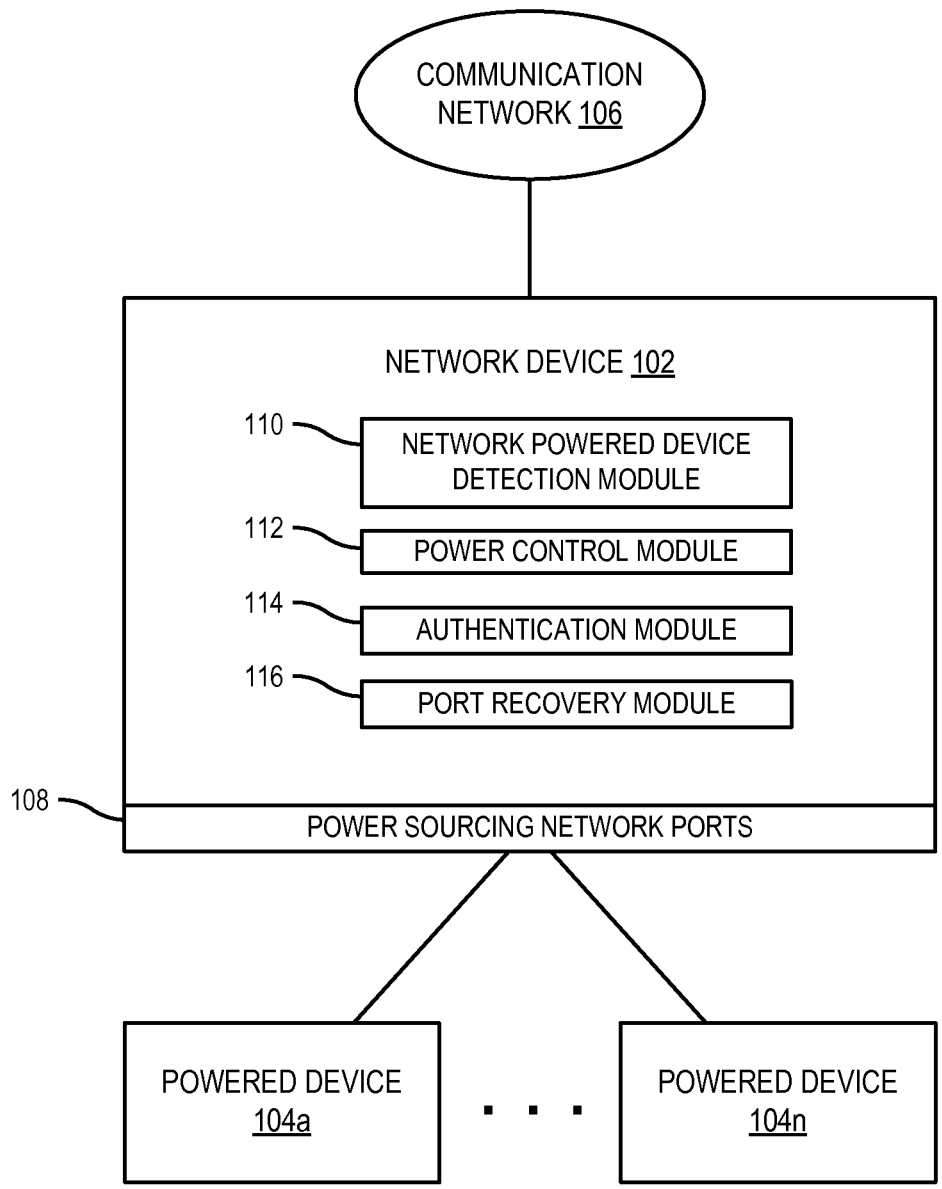
FIG. 1A is a block diagram of a system capable of selectively recovering ports with power restricted from providing power to devices via network connections, according to one example.

FIG. 1A is a block diagram of a system capable of selectively recovering ports with power restricted from providing power to devices via network connections, according to one example. The system 100 can include a network device 102 that communicates with powered devices 104a-104n and/or other devices via a communication network 106. In certain examples, the network device 102 is power sourcing equipment, such as a network switch or hub that can provide power to one or more PDs via a network connection. Further, in some embodiments, powered devices 104a-104n and/or other devices connected via the communication network 106 are computing devices such as servers (e.g., a storage server), client computers, all-in-one thin clients, and mobile computers (e.g., tablets, mobile phones, etc.), special purpose machines such as media players, routing devices (e.g., access points), communication devices (e.g., telephones), etc. The network device 102 and/or the powered devices 104 can be implemented via a processing element, memory, and/or other components.

Figure 1B:
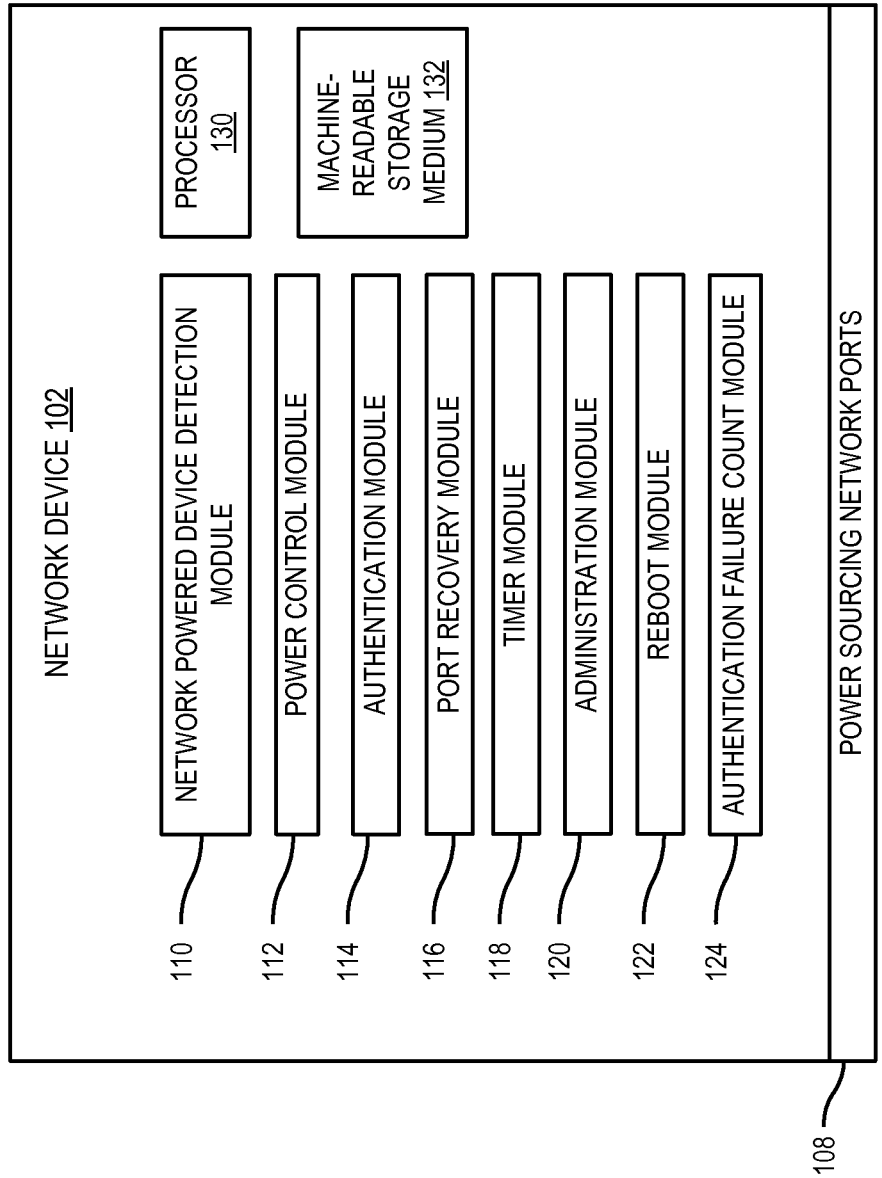
FIG. 1B is a block diagram of a network device capable of resetting power sourcing network ports used to provide power to network powered devices that fail authentication, according to one example.

As shown in FIG. 1A and further detailed in FIG. 1B, network device 102 can include one or more power sourcing network ports 108, a network powered device detection module 110, a power control module 112, an authentication module 114, a and port recovery module 116. Further, as shown in FIG. 1B, the network device 102 can further include a timer module 118, an administration module 120, a reboot module 122, an authentication failure count module 124, a processor 130, a machine-readable storage medium 132 such as memory, or other components. Although not shown in the figures, the network device 102 can include communication components to provide communications between the network device 102 and other devices.

Power sourcing network ports 108 can be ports used to provide communication between connected devices. For example, the ports can include a set of Ethernet ports or other types of communication ports. The power sourcing network ports can also provide power to PDs 104. As such, a power sourcing network port 108 need not provide power, but may offer communication capabilities to other devices. Further, the ports need not be active and used to be considered power sourcing network ports 108. As such, a port can be considered a power sourcing network port 108 if it is configured to be able to provide power and communication capabilities. In certain scenarios, a cable can be used to couple one of the power sourcing network ports to a PD 104.

The network powered device detection module 110 can be used to detect the presence of a computing device upon coupling of the computing device to one of the power sourcing network ports 108. Further, the network powered device detection module 110 can determine whether the computing device is a PD 104. This can be based on one or more procedures, for example, procedures defined using a specification (e.g., the 802.3af standard).

The power control module 112 can control power allocation to the power sourcing network ports 108. As such, when the PD 104 is detected, the power control module 112 can cause provisioning of a power allocation for the associated power sourcing network port 108. The allocation can limited or full. For example, when the PD 104 is detected, the network powered device detection module 110 can determine a class associated with the PD 104. The class can define the amount of power the PD 104 expects to receive. The power allocated can be enough to allow the PD 104 to authenticate via an authentication procedure. The allocation can trigger the network device 102 to provide the power availability to the PD.

The authentication module 114 can determine whether the PD 104 has a permission to receive power from the network device 102. In certain scenarios, the PD 104 can authenticate with a security server available on the communication network 106. As such, the security server can provide authentication instructions to the authentication module 114. In other scenarios, the network device 102 can be used to authenticate the PD 104. If the authentication is successful, the PD 104 continues to receive power and/or receives full allocation of power.

If the authentication of the PD 104 fails to receive permission, the power control module 112 restricts the power allocation. In one example, the restriction can include removing power available at the power sourcing network port 108 from the PD 104. In another example, the restriction can include limiting the amount of power available to the PD 104. For example, the PD 104 can be limited to a class of device less than the class the PD 104 represents itself as.

In one example, IEEE 802.3af and 802.3 at provide for classes of PDs. In the 802.3 at specification, Class 0 provides for a power allocation of 13 W, Class 1 provides for a power allocation of 3.84 W, Class 2 provides for a power allocation of 6.49 W, Class 3 provides for a power allocation of 13 W, and Class 4 provides for a power allocation of 25.5 W. Classes 0-3 are available on 802.3af and 802.3 at while Class 4 is available on 802.3 at. In certain examples, the allocation values can be considered the maximum values of average power over a time range (e.g., 1 second). These examples relate to the power available at the PD. Due to power loss in the cable, the PSE may need to allocate additional power to be able to guarantee the corresponding amount of power to the PD. As such, the PSE may be required to be able to provide a minimum output level of 15.4 W for Class 0, 4 W for class 1, 7 W for class 2, and 15.4 W for class 3. In other examples, other restrictions or other power levels can be used. As noted above, once restricted, these ports may not be usable for its intended purposes, for example, powering a device with network permission to receive power.

As such, the port recovery module 116 can selectively reset the restricted power sourcing network port. In certain examples, the reset of the restriction can be based on a timer, based on administrative control, based on a restart of the network device 102, based on a decoupling of the PD 104 from the port, combinations thereof, etc. In certain embodiments, resetting the port can mean to enable the port to a state where the network powered device detection module 110 can determine whether a PD or another PD becomes attached. Further, in certain embodiments, to perform this selectively can mean to perform the reset based on a trigger specifically associated with the port. The port is returned to a state where the network powered device detection module 110 searches for a coupling of another computing device to the port. This state can be considered an active state, whereas the state when the port is restricted can be considered a restricted state. The change in state can be considered removing the restriction. As such, the network device 102 can further determine whether that PD has permission to receive power from the network device 102. This reset can be performed using software instructions and/or hardware to change the state of the port. If another computing device (e.g., a PD) is found on the reset port, another power allocation can be determined for that computing device. Further, authentication can occur for that computing device.

As noted, in one embodiment, the selective reset is based on time. The timer module 118 can be used to determine when a pre-set amount of time expires. The expiration of time can start based on when the PD 104 is determined not to have permission for power. Further, the power sourcing network port can be selectively reset based on the expiration of pre-set amount of time. A timer can count up to the pre-set amount of time or count down from the pre-set amount of time. Moreover, in certain embodiments, the time can be based on a counter (e.g., an integer counter) and a clock, where the counter increments or decrements based on the clock and the pre-set amount can be an integer value. Further, other manipulations of time can be used. For example, a trigger can be based on time and the power sourcing network port can be selectively reset based on the trigger. The trigger can be, for example, when a timer or counter meets a threshold value.

In another embodiment, the administration module 120 can be used to control the selective reset. For example, the administration module 120 can used to cause presentation of information about the power sourcing network port. For example, the administration module 120 can drive a monitor, a terminal, a messaging service (e.g., email, logs, etc.), etc. to provide information via a communication method. The administration module 120 can also be configured to receive reset information. Reset information can be received from a terminal controlling the network device 102, from another device controlling the network device 102 (e.g., via a web page, command line interface, etc.), from an input mechanism to the network device 102, or the like. When the reset information is received, the power sourcing network port can be reset based on reset information parameters. Reset information parameters can include, for example, a time to reset the port, a request to reset the port immediately, etc.

In a further embodiment, the port can be reset based on a reboot of the network device 102. The reboot module 122 can reboot the network device 102. This can occur based on a hardware reset, a software reset, a power shutdown, or the like. During the reboot, the port can be selectively reset. In one embodiment, the state of the power sourcing network ports 108 can be persistent through reboot. As such, the configuration of a power sourcing network port that is associated with an authenticated device can persist. However, when rebooted, power sourcing network ports that were restricted can be reset into an active state.

In another embodiment, the reset can be based on a change in status of the connectivity to the PD 104. The network powered device detection module 110 can detect the removal of the coupling of the PD 104 from the port. The selective reset can be based on the removal of the coupling. In certain examples, the detection of the removal of the coupling can be determined by monitoring the connectivity of the PD 104 (e.g., by providing a voltage to the device and determining/monitoring current drawn at the voltage and/or a removal of current drawn). When it is determined that the PD 104 has been disconnected, the port can be reset to an active state.

In certain scenarios, multiple resets can occur with the same unauthorized PD 104 connected. As such, the authentication failure count module 124 can count the amount of times the port has been reset using one or more of reset mechanism. If the amount reaches a threshold level, the selective reset of the power sourcing network port is limited. The limitation can be a change in the mechanism used to reset the port (e.g., from timer expiration to administrative manual approval), a change in the behavior of the mechanism (e.g., a larger pre-set amount of time used for an expiration trigger, a count for the amount of time the PD 104 has been disconnected, etc.), or the like.

The communication network 106 can use wired communications, wireless communications, or combinations thereof. Further, the communication network 106 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network 106 can be in the form of a direct network link between devices. Various communications structures and infrastructure can be utilized to implement the communication network(s). In certain examples, a direct link is used to connect the PDs 104 to the network device 102 (e.g., a PSE). Other sets of PSEs and PDs as well as other devices can be communicated with via the communication network 106.

By way of example, the network device 102 and PDs 104 communicate with each other and other components with access to the communication network 106 via a communication protocol or multiple protocols. A protocol can be a set of rules that defines how nodes of the communication network 106 interact with other nodes. Further, communications between network nodes can be implemented by exchanging discrete packets of data or sending messages. Packets can include header information associated with a protocol (e.g., information on the location of the network node(s) to contact) as well as payload information. A program or application executing on the network device 102 or the PDs 104 can utilize one or more layers of communication to utilize the messages. In certain scenarios, an Ethernet cable (e.g., a Category (CAT) 3 cable, a CAT 5 cable, etc.) can be used to connect the network device 102 to the PDs 104 and/or other network elements. The Ethernet cable can carry both power and communications.

Processor 130 may be, at least one central processing unit (CPU), at least one semiconductor-based microprocessor, at least one graphics processing unit (GPU), other hardware devices suitable for retrieval and execution of instructions stored in machine-readable storage medium 132, or combinations thereof. For example, the processor 130 may include multiple cores on a chip, include multiple cores across multiple chips, or combinations thereof. Processor 130 may fetch, decode, and execute instructions to implement the functions of the modules 110-124 and/or the methods of FIGS. 2 and 3. As an alternative or in addition to retrieving and executing instructions, processor 130 may include at least one integrated circuit (IC), other control logic, other electronic circuits, or combinations thereof that include a number of electronic components for performing the functionality of modules 110-124.

Machine-readable storage medium 132 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 132 can be non-transitory. As described in detail herein, machine-readable storage medium 132 may be encoded with a series of executable instructions for performing the functions of the modules 110-124 and/or the methods of FIGS. 2 and 3. It should be noted that, in some embodiments, some modules 110-124 are implemented as hardware devices, while other modules 110-124 are implemented as executable instructions.

FIG. 2 is a flowchart of a method for selectively resetting a power sourcing network port, according to one example. Although execution of method 200 is described below with reference to network device 102, other suitable components for execution of method 200 can be utilized (e.g., another PSE). Additionally, the components for executing the method 200 may be spread among multiple devices. Method 200 may be implemented in the form of executable instructions stored on a machine-readable storage medium, such as storage medium 132, and/or in the form of electronic circuitry.

Method 200 may start at 202, where network device 102 may be in a state where one or more of the power sourcing network ports 108 of the network device 102 is not connected or coupled to a device. As such, the network powered device detection module 110 can search for the presence of a computing device on those ports. A user of a computing device can couple the computing device to one of the ports. In certain scenarios, this can be performed directly onto a physical port on the network device 102. In other scenarios, the coupling can be via a cable, such as an Ethernet cable or a connected socket (e.g., a socket in a wall connected via an Ethernet cable to the network device 102).

The method 200 can proceed to 204, where the network powered device detection module 110 detects the presence of a computing device based on the coupling of the computing device to the power sourcing network port. The detection can be based on a specification (e.g., the 802.3af standard, the 802.3 at standard, a proprietary specification, etc.). For example, a voltage ramp can be sent via one or more lines of the coupling and the network powered device detection module 110 can detect the computing device and/or a classification associated with the computing device based on feedback from the computing device (e.g., the impedance or load on the line). The classifications can include information as to whether the computing device is a device requesting power. If the computing device is a PD requesting power, the PD can use circuitry based on the specification to communicate its classification. In one example, a voltage ramp can be used to determine a characteristic of resistance at different voltage levels to determine the classification.

Then, at 206, the power control module 112 can provide a power allocation to the power sourcing network port for the PD. In one example, the power provided is what is requested based on the classification. In another example, the power provided is a temporary limited amount of power enough to allow the PD to power up to authenticate.

At 208, the authentication module 114 authenticates whether the PD has permission to receive power from the network device 102. In certain scenarios, the permission can be based on a network based authentication procedure between the network device 102 and the PD. In other scenarios, the permission can be based on a network based authentication between the PD and another device (e.g., a security server). In these scenarios, the other device can provide permission information to the network device 102. If the authentication passes between the other device and the PD, the network device 102 can receive permission information indicating the permission. As such, the power control module 112 can provide power to the PD via the port. If the authentication fails, power can be restricted from the PD.

At 210, the power allocated to the PD is restricted if the PD fails to receive permission to receive power based on the authentication. In one example, the restriction includes removing power available at the port. As noted above, other methods of restriction can apply. As such, the port can be placed in a restricted state, that is, a state where the power is restricted at the port.

Then, at 212, a port recovery module 116 can selectively reset the power sourcing network port from the restriction. Removing the restriction can be accomplished by resetting the port to an active state from the restricted state. The selective reset can be based on a trigger. In one example, the trigger can be based on a predetermined timer value. A timer module 118 can set the predetermined timer value when the power allocation is restricted. The selective resetting can occur based on the timer value, for example, when the timer value expires or is reached by a counter or clock. In another example, the trigger can be based on information received from a terminal. For example, information about the port can be displayed at a terminal. An administrator can view the information and provide reset information. An administrative module 120 can receive the reset information and trigger reset of the port based on the reset information. In certain examples, the reset information includes a command to reset the port, a command to reset the port after expiration of a timer, a command to reset the port based on another condition, or the like. Other methods of selectively resetting the power sourcing network port described above can also be used. Further, as noted above, combinations of triggers can be used in conjunction. Then, at 214, the method 200 stops. The network device 102 can continue to perform other functionality. Method 200 shows one example of a resetting of a power sourcing network port, however it is contemplated that multiple ports can be reset in such a manner.

FIG. 3 is a flowchart of a method for resetting a power sourcing network port based on a disconnection of a previously connected computing device, according to one example. Although execution of method 300 is described below with reference to network device 102, other suitable components for execution of method 300 can be utilized (e.g., another PSE). Additionally, the components for executing the method 300 may be spread among multiple devices (e.g., a multi-part network device). Method 300 may be implemented in the form of executable instructions stored on a machine-readable storage medium, such as storage medium 132, and/or in the form of electronic circuitry.

Method 300 may start at 302 and proceed to 304, where an authentication module 114 of the network device 102 determines that a connection to a PD has been formed, but the PD does not have permission to receive power from a power sourcing network port that the PD is connected to. As such, power allocated to the port is restricted.

The method 300 proceeds to 306, where the network powered device detection module 110 can detect that he PD has been removed. In one example, the network powered device detection module 110 can detect the removal based on resistance presented via one or more lines of a connection between the network device 102 and the PD. In another example, network powered device detection module 110 can send a pulse over the connection to determine whether a connection to a device is present. In certain scenarios, even when power is removed from the PD based on restriction, the pulse can be sent. If it is determined that a device that was present is not present, the network powered device detection module 110 can set a memory (e.g., a register) to indicate that the PD has been disconnected.

At 308, the disconnection of the PD can be used to trigger reset of the power sourcing network port. In certain examples, the trigger can further be based on other information. For example, the disconnection may be verified or checked to make sure that the PD is disconnected for at least a certain amount of time before resetting the port. In another example, when the PD is disconnected, a timer can be set to trigger the reset when the timer is met (e.g., expires). Then, at 310, the method 300 stops. The network device 102 can continue to perform other functions.

What is claimed is:

1. A network device comprising:
a plurality of power sourcing network ports;
a network powered device detection module to detect a presence of a computing device upon coupling of the computing device to one of the power sourcing network ports;
a power control module to control power allocation to the power sourcing network ports, wherein the power control module causes provisioning of a power allocation for the one power sourcing network port;
an authentication module to determine whether the computing device has a permission to receive power from the network device, wherein, in response to a determination that the computing device fails to have the permission to receive power from the network device, the power control module restricts the power allocation; and
a port recovery module to selectively reset the one power sourcing network port in response to the determination that the computing device fails to have the permission to receive power from the network device.

2. The network device of claim 1, further comprising:
a timer module to start a pre-set amount of time in response to the determination that the computing device fails to have the permission to receive power from the network device and to determine when the pre-set amount of time expires,
wherein the one power sourcing network port is selectively reset based on the expiration of the pre-set amount of time.

3. The network device of claim 1, further comprising:
an administration module to cause presentation of information about the one power sourcing network port,
wherein the administration module receives reset information, and
wherein the one power sourcing network port is selectively reset based on the received reset information.

4. The network device of claim 1, further comprising:
a reboot module to reboot the network device,
wherein, during the reboot, the one power sourcing network port is selectively reset.

5. The network device of claim 1, wherein the restriction of the power allocation includes removing power available at the one power sourcing network port.

6. The network device of claim 1, wherein the network powered device detection module detects a removal of the coupling of the computing device from the one power sourcing network port, and wherein the selective reset is based on the detected removal of the coupling.

7. The network device of claim 1, further comprising:
an authentication failure count module to determine an amount of times the one power sourcing network port fails an authentication process,
wherein if the amount reaches a threshold level, the selective reset of the one power sourcing network port is limited.

8. The network device of claim 1, wherein the port recovery module selectively resets the one power sourcing network port by returning the one power sourcing network port to a state where the network powered device detection module searches for a coupling of another computing device to the one power sourcing network port and when coupled, the power control module controls another power allocation to the other computing device.

9. A method comprising:
   detecting, at a network device, a presence of a computing device upon coupling the computing device to one of a plurality of power sourcing network ports of the network device;
   providing a power allocation to the one power sourcing network port;
   authenticating to determine whether the computing device has a permission to receive power from the network device;
   restricting the power allocation in response to a determination that the computing device fails to have the permission to receive power from the network device; and
   selectively resetting the one power sourcing network port in response to the determination that the computing device fails to have the permission to receive power from the network device.

10. The method of claim 9, further comprising:
   setting a predetermined timer value when the power allocation is restricted,
   wherein the selective resetting occurs in response to an expiration of the predetermined timer value.

11. The method of claim 9, further comprising:
   receiving reset information from a terminal,
   wherein the one power sourcing network port is selectively reset based on the received reset information.

12. The method of claim 9, wherein the restriction of the power allocation includes removing power available at the one power sourcing network port.

13. A non-transitory machine-readable storage medium storing instructions that, if executed by at least one processor of a network device, cause the network device to:
   detect a coupling of a computing device to one of a plurality of power sourcing network ports of the network device;
   determine a power allocation to the one power sourcing network port;
   determine whether the computing device is permitted to receive power from the network device;
   restrict the power allocation at the one power sourcing network port in response to the determination that the computing device is not permitted to receive power from the network device; and
   selectively reset the one power sourcing network port in response to the determination that the computing device is not permitted to receive power from the network device.

14. The non-transitory machine-readable storage medium of claim 13, wherein the restriction of the power allocation includes removing power available at the one power sourcing network port.

15. The non-transitory machine-readable storage medium of claim 13, further comprising instructions that, if executed by the at least one processor, cause the network device to:
   set a predetermined timer value when the power allocation is restricted;
   determine a trigger in response to an expiration of the predetermined timer value, wherein the one power sourcing network port is selectively reset based on the trigger.

* * * * *